United States Patent
Endo et al.

(10) Patent No.: US 9,233,682 B2
(45) Date of Patent: *Jan. 12, 2016

(54) HYBRID VEHICLE AND CONTROL METHOD OF HYBRID VEHICLE

(75) Inventors: Hiroki Endo, Nisshin (JP); Masaya Yamamoto, Kasugai (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/984,658

(22) PCT Filed: Feb. 10, 2011

(86) PCT No.: PCT/JP2011/052847
§ 371 (c)(1),
(2), (4) Date: Aug. 9, 2013

(87) PCT Pub. No.: WO2012/108028
PCT Pub. Date: Aug. 16, 2012

(65) Prior Publication Data
US 2013/0325236 A1    Dec. 5, 2013

(51) Int. Cl.
*B60W 20/00* (2006.01)
*B60K 6/445* (2007.10)
(Continued)

(52) U.S. Cl.
CPC ............. *B60W 20/106* (2013.01); *B60K 6/445* (2013.01); *B60W 10/06* (2013.01); *B60W 10/08* (2013.01); *B60W 20/00* (2013.01);
(Continued)

(58) Field of Classification Search
CPC ... B60W 20/106; B60W 20/00; B60W 10/06; B60W 10/08; B60K 6/445

USPC ........................................................... 701/22
See application file for complete search history.

(56) References Cited

U.S. PATENT DOCUMENTS 3,936,709 A    2/1976    Wright
4,791,900 A    12/1988    Buck et al.
(Continued)

FOREIGN PATENT DOCUMENTS

EP    0987151 A    3/2000
JP    62-051737 A    3/1987
(Continued)

OTHER PUBLICATIONS

Office Action issued for U.S. Appl. No. 13/515,091 on Jul. 5, 2013.
(Continued)

*Primary Examiner* — John Q Nguyen
*Assistant Examiner* — Nadeem Odeh
(74) *Attorney, Agent, or Firm* — Kenyon & Kenyon LLP (57) ABSTRACT

Vehicle includes an engine, a first rotating electric machine and a control device controlling the rotational speed of the first rotating electric machine such that the rotational speed of the engine matches a target rotational speed. The control device calculates a torque command value of the first rotating electric machine based on an upper limit value of electric power discharged from a power storage device supplying electric power to the first rotating electric machine. The control device calculates the torque command of the first rotating electric machine based on a further restricted value of the upper limit value when a torque restricting condition including simultaneous operation of an accelerator pedal and brake pedal is met.

6 Claims, 5 Drawing Sheets

(51) Int. Cl.
*B60W 10/06* (2006.01)
*B60W 10/08* (2006.01)

(52) U.S. Cl.
CPC ..... *B60W 2510/085* (2013.01); *B60W 2540/10* (2013.01); *B60W 2540/12* (2013.01); *B60W 2710/0644* (2013.01); *B60W 2710/083* (2013.01); *Y02T 10/6239* (2013.01); *Y02T 10/6286* (2013.01); *Y10S 903/903* (2013.01)

(56) References Cited

U.S. PATENT DOCUMENTS

| | | | |
|---|---|---|---|
| 5,913,377 | A | 6/1999 | Ota et al. |
| 6,170,864 | B1 | 1/2001 | Fujita et al. |
| 6,186,539 | B1 | 2/2001 | Foo et al. |
| 6,196,578 | B1 | 3/2001 | Iyoda |
| 6,278,916 | B1 | 8/2001 | Crombez |
| 6,324,454 | B1 | 11/2001 | Obata et al. |
| 6,327,527 | B1 | 12/2001 | Imai et al. |
| 6,347,268 | B1 | 2/2002 | Fujita et al. |
| 6,353,784 | B1 | 3/2002 | Miyaguchi et al. |
| 6,424,899 | B2 | 7/2002 | Imai et al. |
| 6,647,331 | B2 | 11/2003 | Imai et al. |
| 6,892,128 | B2 * | 5/2005 | Asakawa et al. ............ 701/103 |
| 6,915,782 | B2 * | 7/2005 | Hanada et al. ............. 123/399 |
| 7,041,030 | B2 * | 5/2006 | Kuroda et al. ............. 477/21 |
| 7,074,157 | B2 * | 7/2006 | Wakashiro et al. ........... 477/7 |
| 7,099,757 | B2 * | 8/2006 | Niki et al. ................ 701/22 |
| 7,350,808 | B2 | 4/2008 | Miyata et al. |
| 7,734,404 | B2 | 6/2010 | Shiiba et al. |
| 7,917,271 | B2 | 3/2011 | Tamada |
| 8,224,544 | B2 * | 7/2012 | Sah et al. ................ 701/68 |
| 8,428,845 | B2 * | 4/2013 | Miyazaki et al. ........... 701/101 |
| 8,442,741 | B2 * | 5/2013 | Minase et al. ............ 701/102 |
| 2002/0165651 | A1 | 11/2002 | Hesse et al. |
| 2004/0011580 | A1 | 1/2004 | Miyata et al. |
| 2004/0127333 | A1 | 7/2004 | McCall |
| 2005/0003928 | A1 * | 1/2005 | Niki et al. ............... 477/5 |
| 2005/0143877 | A1 | 6/2005 | Cikanek et al. |
| 2006/0037802 | A1 | 2/2006 | Mori |
| 2009/0062987 | A1 | 3/2009 | Kim et al. |
| 2010/0036566 | A1 | 2/2010 | Hayami |
| 2010/0076661 | A1 | 3/2010 | Ueoka et al. |
| 2011/0022284 | A1 | 1/2011 | Umakoshi et al. |
| 2011/0112740 | A1 | 5/2011 | Hashimoto et al. |
| 2012/0095634 | A1 * | 4/2012 | Miyamoto et al. ........... 701/22 |
| 2012/0116650 | A1 | 5/2012 | Miyazaki et al. |
| 2012/0259524 | A1 | 10/2012 | Miyazaki et al. |
| 2012/0290179 | A1 * | 11/2012 | Oishi et al. ............. 701/54 |
| 2012/0290188 | A1 * | 11/2012 | Oishi et al. ............. 701/99 |
| 2013/0024090 | A1 * | 1/2013 | Minase et al. ........... 701/102 |
| 2013/0030674 | A1 * | 1/2013 | Minase et al. ........... 701/110 |
| 2013/0030675 | A1 * | 1/2013 | Minase et al. ........... 701/110 |
| 2013/0325236 | A1 | 12/2013 | Endo et al. |

FOREIGN PATENT DOCUMENTS

| | | |
|---|---|---|
| JP | 64-021026 U | 2/1989 |
| JP | 05-077705 A | 3/1993 |
| JP | 05-238290 A | 9/1993 |
| JP | 07-019077 A | 1/1995 |
| JP | 2593092 B2 | 3/1997 |
| JP | 10-152014 A | 6/1998 |
| JP | 2000-344046 A | 12/2000 |
| JP | 2002-004909 A | 1/2002 |
| JP | 2002104130 A | 4/2002 |
| JP | 2003-175747 A | 6/2003 |
| JP | 2005-207260 A | 8/2005 |
| JP | 2005-253151 A | 9/2005 |
| JP | 2005-273495 A | 10/2005 |
| JP | 2005-291030 A | 10/2005 |
| JP | 2005-306320 A | 11/2005 |
| JP | 2005-323481 A | 11/2005 |
| JP | 2006-233870 A | 9/2006 |
| JP | 2008-049775 A | 3/2008 |
| JP | 2008-168720 A | 7/2008 |
| JP | 2008-174048 A | 7/2008 |
| JP | 2008-296806 A | 12/2008 |
| JP | 2009-166670 A | 7/2009 |
| JP | 2010-038051 A | 2/2010 |

OTHER PUBLICATIONS

Office Action issued for U.S. Appl. No. 13/515,091 on Jan. 15, 2014.
Advisory Action issued for U.S. Appl. No. 13/515,091 on Mar. 21, 2014.
Office Action issued for U.S. Appl. No. 13/515,091 on Jun. 30, 2014.
Office Action issued for U.S. Appl. No. 13/515,126 on Apr. 3, 2013.
Office Action issued for U.S. Appl. No. 13/515,126 on Aug. 5, 2013.
Advisory Action issued for U.S. Appl. No. 13/515,126 on Oct. 24, 2013.
Offie Action issued for U.S. Appl. No. 13/515,126 on Dec. 27, 2013.
Office Action issued for U.S. Appl. No. 13/515,126 on Nov. 4, 2014.
Notice of Allowance issued for U.S. Appl. No. 13/639,480 on Mar. 4, 2013.
Office Action issued for U.S. Appl. No. 13/639,414 on Aug. 12, 2013.
Office Action issued for U.S. Appl. No. 13/639,414 on Jan. 8, 2014.
Advisory Action issued for U.S. Appl. No. 13/639,414 on Apr. 22, 2014.
Office Action issued for U.S. Appl. No. 13/639,414 on Aug. 15, 2014.
Office Action issued for U.S. Appl. No. 13/639,442 on Aug. 12, 2013.
Office Action issued for U.S. Appl. No. 13/639,442 on Jan. 10, 2014.
Advisory Action issued for U.S. Appl. No. 13/639,442 on Apr. 22, 2014.
Notice of Allowance mailed on Dec. 24, 2014, in U.S. Appl. No. 13/515,091.
Corrected Notice of Allowability mailed on Feb. 26, 2015, in U.S. Appl. No. 13/515,091.
Notice of Allowance issued on Feb. 9, 2015, in U.S. Appl. No. 13/515,126.

* cited by examiner

HYBRID VEHICLE AND CONTROL METHOD OF HYBRID VEHICLE

CROSS REFERENCE TO RELATED APPLICATION

This is a national phase application based on the PCT International Patent Application No. PCT/JP2011/052847 on Feb. 10, 2011, the entire contents of which are incorporated herein by reference.

TECHNICAL FIELD

The present invention relates to a hybrid vehicle and a control method of a hybrid vehicle, particularly control when the brake pedal and accelerator pedal are operated simultaneously.

BACKGROUND ART

Japanese Patent Laying-Open No. 2005-323481 (PTD 1) discloses a control method of a hybrid vehicle. The hybrid vehicle has an engine, a first motor, a drive shaft and a second motor connected to a planetary gear mechanism, and includes a battery transferring electric power to/from the two motors. In the case where the accelerator pedal and the brake pedal are both stepped on when the vehicle is in a stopped state to request stall-starting according to the control method, the loss power and margin power of the drive system calculated based on the torque upper limit of the second motor at stall-starting are added to the battery input limit Win to set the engine required power. The engine and the first motor are controlled while the second motor is restricted to be within the range of the torque upper limit.

CITATION LIST

Patent Document

PTD 1: Japanese Patent Laying-Open No. 2005-323481
PTD 2: Japanese Patent Laying-Open No. 2008-49775
PTD 3: Japanese Patent Laying-Open No. 2009-166670

SUMMARY OF INVENTION

Technical Problem

When running on a road where the friction coefficient $\mu$ is low during, for example, the winter season, an operation on the brake pedal with the accelerator pedal at a full-throttle position will cause the phenomenon of the wheel slipping against the road surface, and then gripping thereon.

The drive shaft of the wheel is rapidly reduced in rotational speed by the brake operation. The rotational speed of the engine will also be reduced according to the reduction in the rotational speed of the wheel drive shaft at a vehicle of the type that is configured to divide the engine torque partially for transmission to the wheel using a power split mechanism. This type of hybrid vehicle has the rotational speed of a motor generator controlled in a feedback manner such that the rotational speed of the engine is held constant.

However, if the feedback control cannot follow the rapid change in the rotational speed of the wheel drive shaft, there is a possibility of excessive current being discharged from the battery.

An object of the present invention is to provide a hybrid vehicle having battery protection enhanced when the accelerator pedal and brake pedal are operated simultaneously, and a control method thereof.

Solution to Problem

A hybrid vehicle of the present invention includes an internal combustion engine, a first rotating electric machine, a drive shaft rotating in cooperation with a wheel, a power split mechanism splitting power mechanically between a rotational shaft of the internal combustion engine, a rotational shaft of the first rotating electric machine and the drive shaft, and a control device controlling the rotational speed of the first rotating electric machine such that the rotational speed of the internal combustion engine matches a target rotational speed. The control device calculates a torque command value of the first rotating electric machine based on an upper limit value of electric power discharged from a power storage device supplying electric power to the first rotating electric machine. The control device calculates, when a torque restricting condition including simultaneous operation of an accelerator pedal and brake pedal is met, the torque command of the first rotating electric machine based on a further restricted value of the upper limit value.

Preferably, the torque restricting condition includes the vehicle speed exceeding a threshold value, in addition to the simultaneous operation of the accelerator pedal and brake pedal.

More preferably, the control device calculates, when the internal combustion engine is to be started using the first rotating electric machine in a normal operation, a torque command value of the first rotating electric machine based on a temporarily relaxed value of the upper limit value. Further, the control device calculates, when the internal combustion engine is to be started using the first rotating electric machine in the case where the torque restricting condition is met, a torque command value of the first rotating electric machine based on the upper limit value, prohibiting usage of a temporarily relaxed value of the upper limit value.

Preferably, the hybrid vehicle further includes a second rotating electric machine rotating with its rotational shaft in cooperation of the drive shaft.

Another aspect of the present invention is directed to a control method of a hybrid vehicle. The hybrid vehicle includes an internal combustion engine, a first rotating electric machine, a drive shaft rotating in cooperation with a wheel, and a power split mechanism splitting power mechanically between a rotational shaft of the internal combustion engine, a rotational shaft of the first rotating electric machine and the drive shaft. The control method includes the steps: of determining whether a torque restricting condition is met or not; setting, when the torque restricting condition is not met, an upper limit value of electric power discharged from a power storage device supplying electric power to the first rotating electric machine as a parameter for calculating a torque command value of the first rotating electric machine; setting a further restricted value of the upper limit value as the parameter when the torque restricting condition is met; and calculating the torque command value of the first rotating electric machine based on the parameter. The torque restricting condition includes simultaneous operation of an accelerator pedal and brake pedal.

Advantageous Effects of Invention

According to the present invention, battery protection is enhanced when the accelerator pedal and brake pedal are operated simultaneously. This can prevent the event of the battery lifetime being shortened than the expected lifetime.

DESCRIPTION OF EMBODIMENTS

The present invention will be described in detail with reference to the drawings. In the drawings, the same or corresponding elements have the same reference characters allotted, and description thereof will not be repeated.

Figure 1:
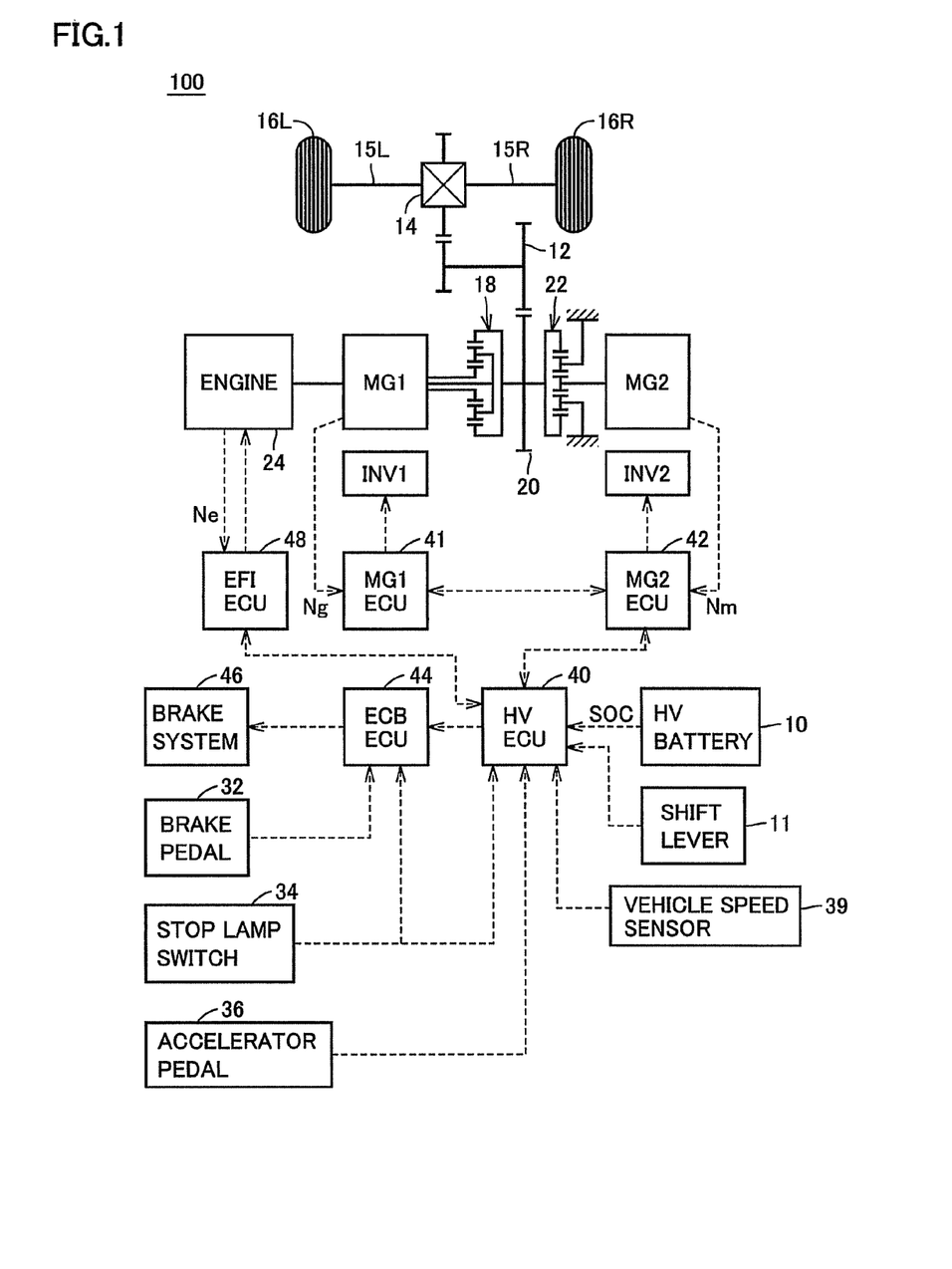
FIG. 1 is an entire block diagram of a hybrid vehicle 100 according to an embodiment.

FIG. 1 is an entire block diagram of hybrid vehicle 100 of the present embodiment.

Referring to FIG. 1, hybrid vehicle 100 includes an engine 24, a motor MG2, a generator MG1, a planetary gear 18, a reduction gear 22, a power output gear 20, a power transmission gear 12, a differential gear 14, drive shafts 15L, 15R, and wheels 16L, 16R.

Planetary gear 18 is configured including a sun gear coupled to a hollow sun gear shaft through which a carrier shaft concentric with the crankshaft of engine 24 passes at the shaft center, a ring gear coupled to a ring gear shaft arranged concentric with the carrier shaft, a plurality of planetary pinion gears arranged between the sun gear shaft and the ring gear, and taking an orbital motion about the sun gear while turning on its own axis, and a planetary carrier coupled to the end of the carrier shaft for supporting the rotational shaft of each planetary pinion gear. The ring gear of the planetary gear is coupled to power output gear 20.

Reduction gear 22 is a planetary gear having the planetary carrier fixed to the gear case. The sun gear is coupled to motor MG2, and the ring gear is coupled to power output gear 20. The rotational speed of motor MG2 rotating at high speed is reduced by reduction gear 22 for transmission to power output gear 20.

Hybrid vehicle 100 further includes an inverter INV1 for driving generator MG1, an inverter INV2 for driving motor MG2, MG1-ECU 41 and MG2-ECU 42 controlling inverters INV1 and INV2, respectively, and an HV battery 10 for supplying electric power to inverters INV1 and INV2.

Generator MG1 mainly functioning as a power generator also functions as an electric motor at the time of cranking to start engine 24. Motor MG2 mainly functioning as an electric motor also functions as a power generator during a vehicle braking mode or the like to collect the regenerated electric power at HV battery 10.

Hybrid vehicle 100 also includes a shift lever 11. By means of shift lever 11, the driver can set a desired shift range such as driving or parking at HV-ECU 40.

Hybrid vehicle 100 also includes a brake pedal 32, a stop lamp switch 34, a brake system 46, and an ECB-ECU 44 controlling brake system 46. ECB-ECU 44 controls brake system 46 according to a signal applied from brake pedal 32 and stop lamp switch 34 and a control signal from HV-ECU 40.

Hybrid vehicle 100 further includes an accelerator pedal 36, an EFI-ECU 48 controlling engine 24, a vehicle speed sensor 39, and an HV-ECU 40 receiving various signals from the position sensor of accelerator pedal 36, and/or a sensor such as a vehicle speed sensor to send a command to MG1-ECU 41, MG2-ECU 42, ECB-ECU 44 and EFI-ECU 48.

HV-ECU 40, MG1-ECU 41, MG2-ECU 42, ECB-ECU 44 and EFI-ECU 48 may be configured to be gathered into one ECU or divided into another group of a number of units other than 4.

Accelerator pedal 36 and brake pedal 32 are operation members to apply the user's intention of increasing or decreasing the speed.

The control input on accelerator pedal 36 is detected by an accelerator position sensor not shown. The output from the accelerator position sensor is provided to HV-ECU 40. HV-ECU 40 receives each output from stop lamp switch 34, the accelerator position sensor, and vehicle speed sensor 39 to output a corresponding control signal to MG1-ECU 41, MG2-ECU 42, EFI-ECU 48 and ECB-ECU 44.

It is to be noted that the communication between MG1-ECU 41 and HV-ECU 40 is carried out via MG2-ECU 42, as shown in FIG. 1. Therefore, there is a delay in the arrival of rotational speed Ng of generator MG1 at HV-ECU 40, as compared to rotational speed Nm of MG2.

Figure 2:
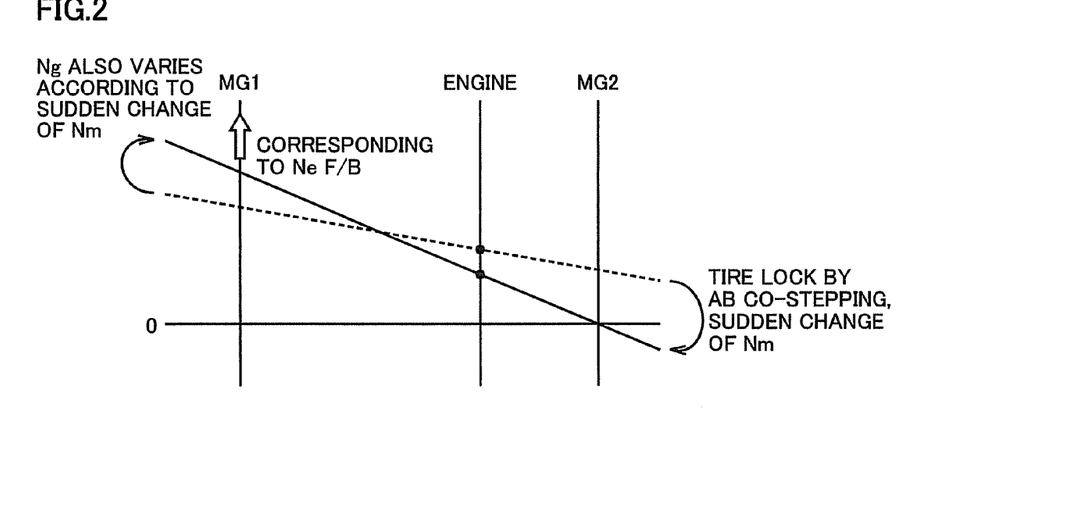
FIG. 2 is an alignment chart for describing a problem occurring when the accelerator pedal and brake pedal are operated simultaneously at the vehicle of FIG. 1.

FIG. 2 is an alignment chart to describe a problem occurring when the accelerator pedal and brake pedal are operated simultaneously in the vehicle of FIG. 1.

FIG. 2 shows sequentially from the left the rotational speed of the carrier of planetary gear 18 in FIG. 1 (rotational speed Ng of generator MG1), the rotational speed of the sun gear (engine rotational speed Ne), and the rotational speed of the ring gear (rotational speed Nm of motor MG2×speed reduction ratio of reduction gear 22).

Since the three shafts of planetary gear 18 are mechanically coupled by a gear mechanism, the aforementioned three rotational speeds are aligned on one straight line in the alignment chart. For the sake of understanding, MG2 is indicated at the right axis assuming that there is no reduction gear 22.

It is assumed that the broken line in FIG. 2 indicates the initial state. In this initial state, the engine is currently operating so that the engine rotational speed takes a relatively high value. Furthermore, the vehicle speed also takes a relatively high value.

It is now assumed that the brake is stepped on while the accelerator is still stepped under the initial state (hereinafter, referred to as accelerator-brake co-stepped state). In response, the rotational speed of motor MG2 approaches zero in accordance with the sudden reduction of the rotational speed of the wheel. The engine rotational speed and generator MG1 rotational speed also change, as indicated by the solid line. Engine rotational speed Ne is reduced whereas rotational speed Ng of generator MG1 increases.

At this stage, HV-ECU 40 of FIG. 1 carries out feedback control such that the change in engine rotational speed Ne returns to the former speed. Specifically, torque is generated at generator MG1 so as to further increase the rotational speed of generator MG1. This torque is indicated by the arrow in FIG. 2 (indicated as "corresponding to Ne F/B"). Therefore, output power Pg of generator MG1 increases.

Figure 3:
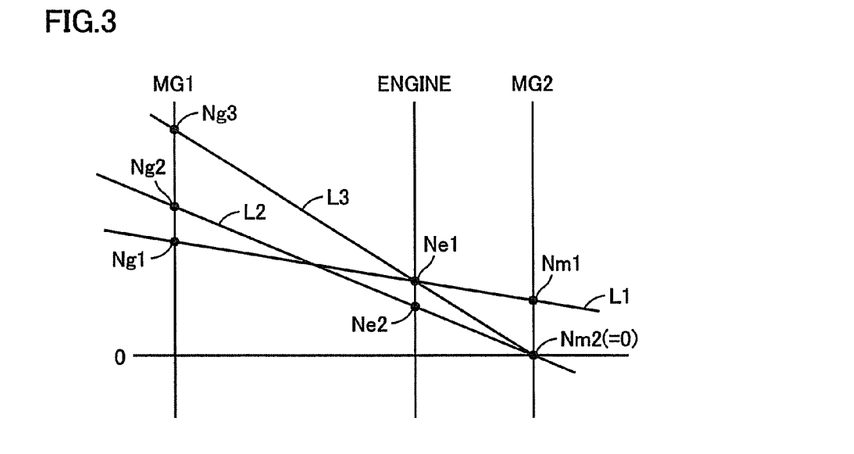
FIG. 3 is a diagram to describe change in the rotational speed of each shaft of a planetary gear.

FIG. 3 is a diagram to describe a change in the rotational speed of each shaft in the planetary gear.

Referring to FIG. 3, in the initial state, the rotational speed of generator MG1 is Ng1, the rotational speed of the engine is Ne1, and the rotational speed of motor MG2 (×speed reduction ratio of reduction gear 22) is Nm1, as indicated by straight line L1.

Immediately after attaining the accelerator-brake co-stepped state, the rotational speed of generator MG1 is Ng2, the rotational speed of the engine is Ne2, and the rotational speed of motor MG2 (×speed reduction ratio of reduction gear 22) is Nm2 (=0), as indicated by straight line L2.

Since feedback is directed such that the engine rotational speed is maintained constant, the rotational speed of generator MG1 increases to Ng3 whereas the engine rotational speed returns to Ne1, as indicated by straight line L3.

However, rotational speed Ng from MG1-ECU 41 is not immediately transmitted to HV-ECU 40 due to communication delay, as described with reference to FIG. 1. At HV-ECU 40, power Pg of generator MG1 and power Pm of motor MG2 are restricted such that the total of powers Pg and Pm does not exceed the discharge restriction value Wout from HV battery 10. However, the control of Pg+Pm<Wout does not work appropriately due to the communication delay. Battery current IB may become excessive to cause power exceeding discharge restriction value Wout to be discharged from HV battery 10. Such repetition will possibly shorten the battery lifetime than the expected lifetime.

Figure 4:
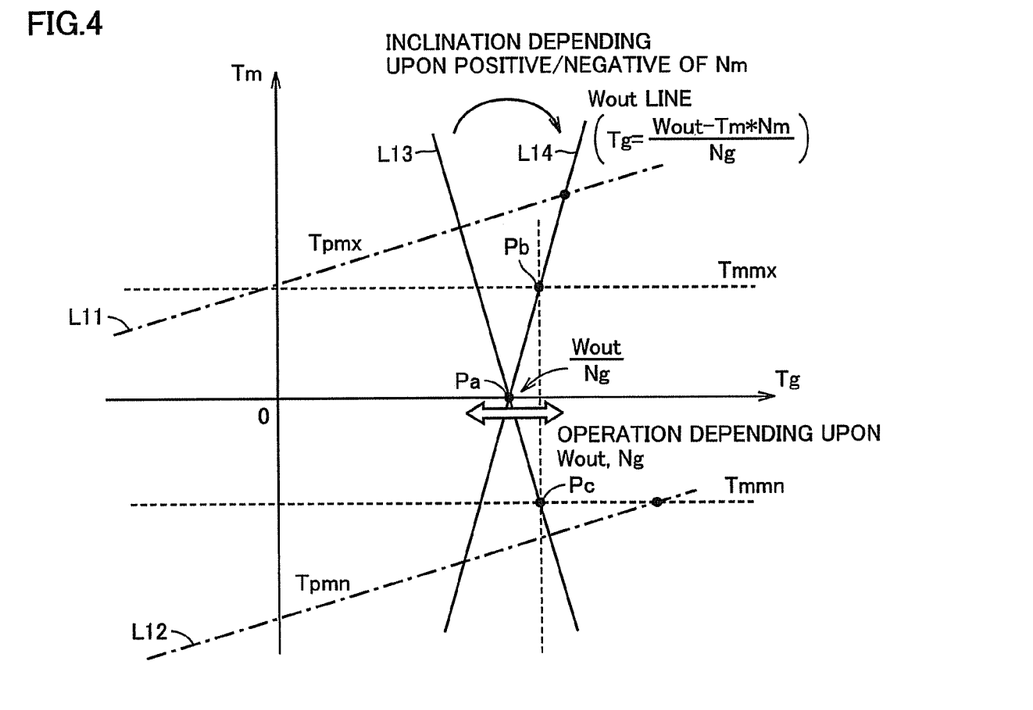
FIG. 4 is a diagram to describe calculation of MG1 torque.

FIG. 4 is a diagram to describe calculation of the torque of generator MG1.

Referring to FIG. 4, torque Tm of motor MG2 is plotted along the vertical axis whereas torque Tg of generator MG1 is plotted along the horizontal axis. The range of torque output allowed from motor MG2 is within the range between maximum value Tmmx and minimum value Tmmn.

Line L11 represents the torque command when the accelerator is at a full-throttle position. Line L12 represents the torque command when the accelerator is OFF. Lines L13 and L14 represent the boundary determined by discharge restriction value Wout from HV battery 10. The region at the right side of lines L13 and L14 is beyond discharge restriction value Wout. The torque command is prohibited from taking a value located in this region.

Lines L13 and L14 indicating the boundary determined by discharge restriction value Wout are represented by the following equation (1):

$$Tg=(Wout-Tmmx*Nm)/Ng \quad (1)$$

where Tg is the torque of generator MG1, Ng the rotational speed of generator MG1, Tm the torque of motor MG2, Nm the rotational speed of motor MG2, and Wout the discharge restriction value from HV battery 10.

It is appreciated from equation (1) that the inclination of the lines representing the boundary in FIG. 4 changes depending upon the positive/negative sign of Nm. When Nm is positive, the boundary is defined as line L13. When Nm is negative, the boundary is defined as line L14.

The upper limit value of torque Tg when the accelerator is at a full-throttle position is represented by the intersection point between lines L14 and L11. However, Since this is outside the motor output allowable range, the torque command is eventually restricted to the point indicated by Pb.

The upper limit value of torque Tg when the accelerator is OFF is represented by the intersection point between lines L13 and L12. Since this is outside the motor output allowable range, the torque command is eventually restricted to the point indicated by Pc.

Torque Tg at point Pa where lines L13 and L14 cross the horizontal axis is represented by Tg=Wout/Ng. Point Pa moves depending upon Wout and Ng, as indicated by the double-headed arrow in FIG. 4.

Since the upper limit value of torque Tg applied when the accelerator is at a full-throttle position is indicated eventually by point Pb, Tm=Tmmx is inserted into equation (1) to give equation (2).

$$Tg=(Wout-Tmmx*Nm)/Ng \quad (2)$$

Now, let us consider the calculation of Tg referring to FIGS. 1 and 3 again. According to the configuration of FIG. 1, the change in Ng is transmitted to HV-ECU 40 with a delay relative to the change in Nm.

It is now assumed that the vehicle has changed its state from lines L1 to L2 in FIG. 3. The motor rotational speed Nm changes from Nm1 to Nm2. However, the generator rotational speed Ng does not exhibit the change from Ng1 to Ng2. Since Nm2=0, equation (2) gives Tg=Wout/Ng1. Therefore, Tg will become greater than the original value since Ng1>Ng2. If generator MG1 is controlled with a torque command value Tg greater than the original value, discharge restriction value Wout of HV battery 10 cannot be ensured.

In order to reduce torque command value Tg, a smaller value should be used for Wout in the calculation of torque command value Tg. In other words, a further restricted value of Wout is to be used in the calculation of torque command value Tg.

As to restricting Wout, a value $\Delta W$ determined empirically under various conditions is to be subtracted from Wout, or a coefficient k smaller than 1, determined empirically, is to be multiplied with Wout. Specifically, Wout (Tg)=Wout−$\Delta W$, Wout (Tg)=k*Wout or the like is to be employed, where Wout (Tg) is the value used for calculating torque command value Tg.

Figure 5:
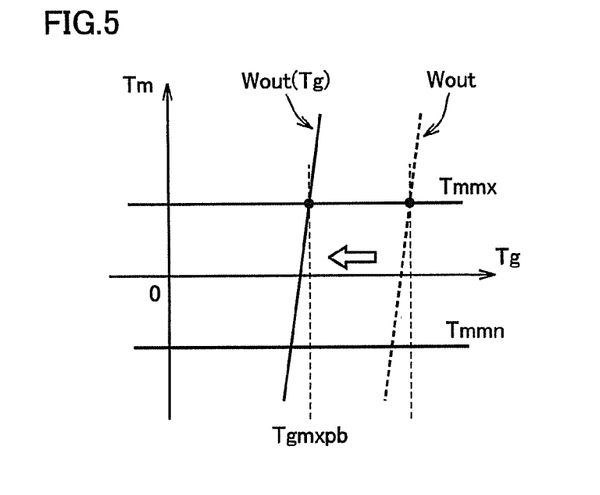
FIG. 5 is a diagram to describe calculation of an upper limit value Tgmxpb of a torque command value Tg with Wout restricted.

FIG. 5 is a diagram to describe the calculation of upper limit value Tgmxpb of torque command value Tg by further restricting discharge restriction value Wout.

FIG. 5 shows line L14 of FIG. 4 shifted leftward by restricting Wout. Accordingly, upper limit value Tgmxpb of the torque command value is shifted leftward to restrict the torque. As a result, discharge restriction value Wout from HV battery 10 can be ensured.

Figure 6:
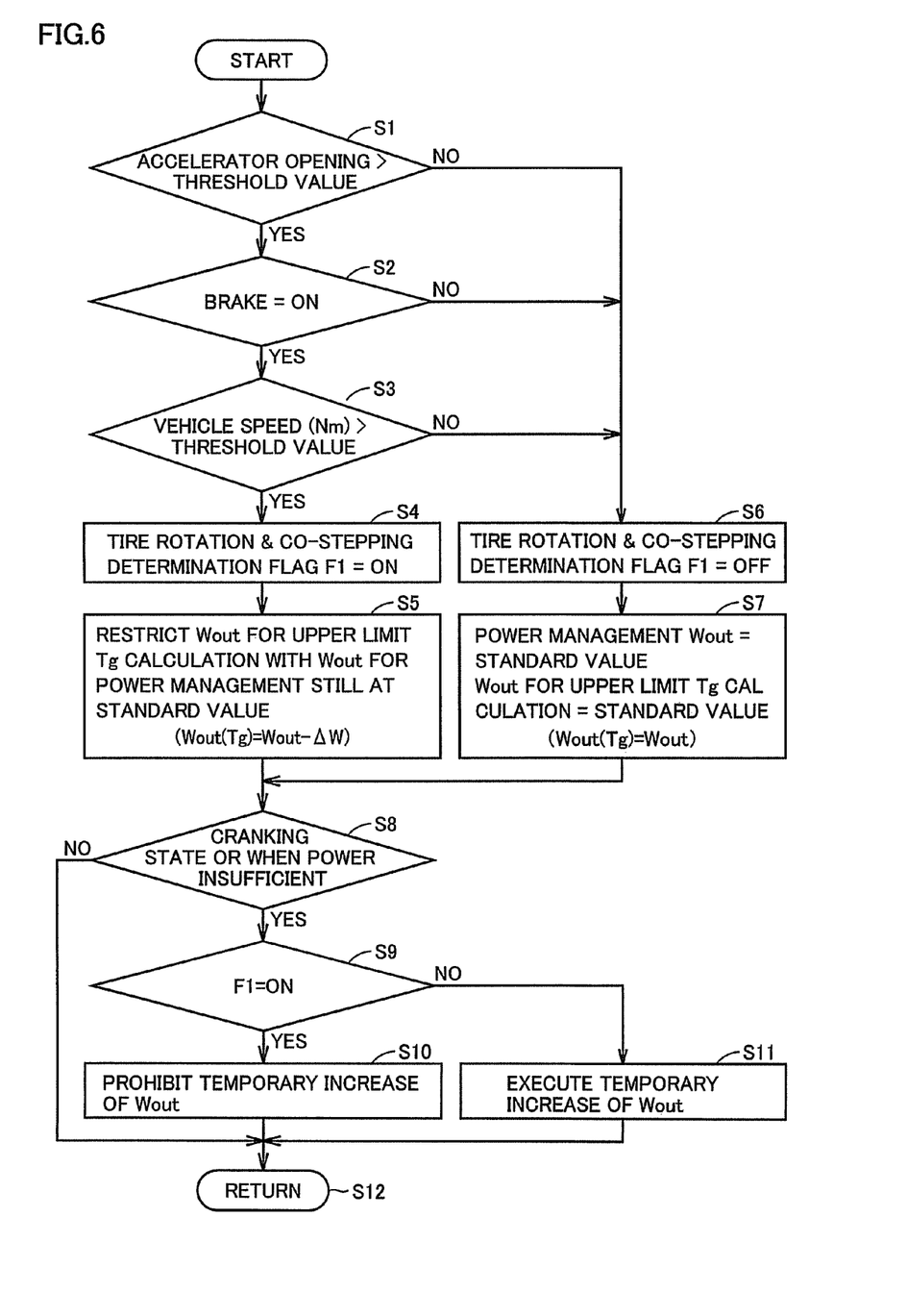
FIG. 6 is a flowchart to describe the procedure of determining Wout (Tg) in calculating torque command value Tg.

FIG. 6 is a flowchart to describe the procedure of determining Wout (Tg) in calculating torque command value Tg. This procedure is invoked and executed from a predetermined main routine at every constant period or every time a predetermined condition is established.

Referring to FIGS. 1 and 6, HV-ECU 40 first determines at step S1 whether the accelerator opening defined by the operation of accelerator pedal 36 is greater than a threshold value or not. When accelerator opening>threshold value is established, control proceeds to step S2; otherwise, control proceeds to step S6.

At step S2, HV-ECU 40 determines whether brake pedal 32 is operated or not, i.e. whether brake=ON or not. When brake=ON is satisfied, control proceeds to step S3; otherwise, control proceeds to step S6.

At step S2, HV-ECU 40 determines whether the vehicle speed obtained from vehicle speed sensor 39 is greater than a threshold value. When vehicle speed>threshold value is satisfied, control proceeds to step S4. Control proceeds to step S6 when vehicle speed>threshold value is not satisfied.

At step S4, HV-ECU 40 sets ON a determination flag F1 indicating the tire rotation and accelerator-brake co-stepped state. At step S5, HV-ECU 40 restricts Wout for upper limit Tg calculation with discharge restriction value Wout for power management still at the standard value. In other words, Wout (Tg)=Wout−$\Delta W$ is set for calculating the upper limit value of command torque Tg of generator MG1. Alternatively, Wout (Tg)=k*Wout may be set, where k is a positive number smaller than 1. ΔW and k can be determined empirically.

At step S6, HV-ECU 40 sets determination flag F1 indicating the tire rotation and accelerator-brake co-stepped state at OFF. At step S7, HV-ECU 40 sets discharge restriction value Wout for power management at the standard value, and also sets Wout for upper limit Tg calculation at the standard value. In other words, Wout (Tg)=Wout is set for calculation of the upper limit value of command torque Tg of generator MG1.

Upon completion of step S5 or step S7, the setting of Wout (Tg) for calculating the upper limit value of command torque Tg of generator MG1 relative to Wout is defined.

Thereafter, whether to permit or prohibit temporary relaxation of Wout at the time of cranking to start the engine or when the power is insufficient is additionally switched. The procedure of steps S8-S11 does not have to be carried out. The advantage of enhancing battery protection can be achieved even in this case, as will be described afterwards.

At step S8, a determination is made to identify whether in a cranking state where an engine start request is generated or a state where the power is insufficient. For example, when the driving power requirement exceeds the threshold value (the accelerator is stepped on) when the engine is stopped, a request to start the engine is generated. Also, for example, when the driver requested power determined by the accelerator opening position and vehicle speed is greater than the normally set discharge restriction value Wout (standard value), a determination is made that the power is insufficient. In the case of cranking at step S8, control proceeds to step S9. When not in a cranking state at step S8, control proceeds to step S12 to return to the main routine.

At step S9, a determination is made as to whether flag F1 indicating the tire rotation and accelerator-brake co-stepped state is ON or not. When F1=ON at step S9, control proceeds to step S10; otherwise when F1=OFF, control proceeds to step S11.

At step S11, a process to temporarily increase Wout is executed. In other words, discharge restriction value Wout from HV battery 10 is temporarily relaxed. Accordingly, the event of engine 24 not being able to be started by insufficient rotation of generator MG1, the event of not being able to run over an obstacle such as a stepped surface, or the event of the driver feeling that the torque is insufficient can be avoided. Since discharge restriction value Wout is set according to the battery capacitance, battery temperature, and the like based on a presumption of discharging for a relatively long time, alleviation is allowed as long as the relevant time is short such as at the time of cranking, riding over an obstacle, temporary acceleration, or the like.

At step S10, the process of temporarily increasing Wout is prohibited. In other words, temporary relaxation of discharge restriction value Wout from HV battery 10 is prohibited. Accordingly, battery protection is ensured when the accelerator pedal and brake pedal are both operated to cause occurrence of slipping and gripping, Upon completion of step S10 or step S11, control proceeds to step S12 to return to the main routine.

Figure 7:
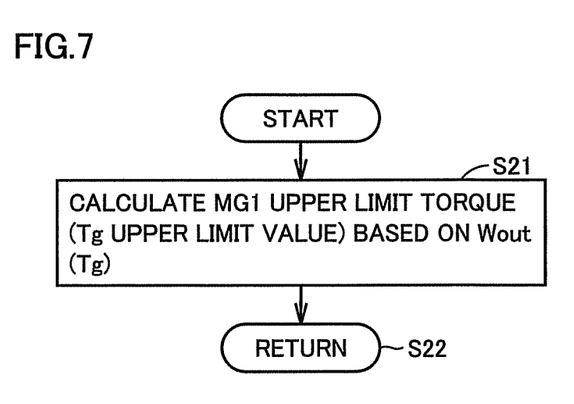
FIG. 7 is a flowchart to describe the procedure of a HV-ECU 40 calculating MG1 upper limit torque.

FIG. 7 is a flowchart to describe the procedure of HV-ECU 40 calculating the upper limit torque of MG1. This procedure is invoked and executed from a predetermined main routine at every constant period or every time a predetermined condition is established.

The procedure in the flowchart of FIG. 7 is executed based on Wout (Tg) determined in FIG. 6. Specifically, at step S21, HV-ECU 40 calculates MG1 upper limit torque (also referred to as Tg upper limit value) based on whether Wout is to be temporarily relaxed, and how Wout (Tg) is related to Wout, determined at FIG. 6.

This calculation is carried out as described with reference to FIGS. 4 and 5. Specifically, MG1 upper limit torque is Tg=Wout (Tg)/Ng1.

For example, Tg=(Wout−ΔW)/Ng1 or Tg=(k*Wout)/Ng1 is established when flag F1=ON with relaxation of Wout during cranking prohibited. When flag F1=OFF, Tg=Wout/Ng1 is established with relaxation of Wout during cranking allowed.

Accordingly, the battery discharge restriction value can be ensured even in the case where both the accelerator pedal and brake pedal are operated simultaneously so that slipping and gripping occur to cause sudden change in the rotational speed of each of generator MG1, motor MG2 and the engine.

Specifically, in experiments restricting Wout to calculate Tg, i.e. Wout (Tg), as in the present embodiment, the battery peak current when both the accelerator pedal and brake pedal are operated was lowered to 76.0% with the battery peak current prior to incorporating the measures as 100%. Furthermore, the battery peak current was lowered to 68.3% when relaxation of Wout during cranking was prohibited.

Thus, the probability of ensuring the battery discharge restriction value becomes higher to enhance battery protection. The event of the battery lifetime becoming shorter than the expected lifetime can be avoided.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

Reference Signs List 10 battery; 11 shift lever; 12 power transmission gear; 14 differential gear; 15L, 15R drive shaft; 16L, 16R wheel; 18 planetary gear; 20 power output gear; 22 reduction gear; 24 engine; 32 brake pedal; 34 stop lamp switch; 36 accelerator pedal; 38 accelerator position sensor; 39 vehicle speed sensor; 46 brake system; 100 hybrid vehicle; INV1, INV2 inverter; MG1 generator; MG2 motor.

The invention claimed is:

1. A hybrid vehicle comprising:
an internal combustion engine, a first rotating electric machine,
a power storage device supplying electric power to said first rotating electric machine, a drive shaft rotating in cooperation with a wheel,
a power split mechanism mechanically splitting power between a rotational shaft of said internal combustion engine, a rotational shaft of said first rotating electric machine, and said drive shaft, and
a control device controlling a rotational speed of said first rotating electric machine such that the rotational speed of said internal combustion engine matches a target rotational speed, said control device calculating a torque command value of said first rotating electric machine such that the electric power discharged from said power storage device does not exceed an upper limit value,
when a torque restricting condition including simultaneous operation of an accelerator pedal and a brake pedal as well as a vehicle speed exceeding a threshold value is met, said control device changing said upper limit value to a further restricted value and calculating the torque command value of said first rotating electric machine, and wherein said control device calculates the torque command value of said first rotating electric machine based on a temporarily relaxed value of said further restricted value of said upper limit value when said internal combustion engine is to be started using said first rotating electric machine in a normal operation, and calculates the torque command value of said first rotating electric machine based on said upper limit value, prohibiting usage of a temporarily relaxed value of said upper limit value, when said internal combustion engine is to be started using said first rotating electric machine in a case where said torque restricting condition is met.

2. A hybrid vehicle comprising:
an internal combustion engine, a first rotating electric machine,
a power storage device supplying electric power to said first rotating electric machine, a drive shaft rotating in cooperation with a wheel,
a power split mechanism mechanically splitting power between a rotational shaft of said internal combustion engine, a rotational shaft of said first rotating electric machine, and said drive shaft, and
a control device controlling a rotational speed of said first rotating electric machine such that the rotational speed of said internal combustion engine matches a target rotational speed, said control device calculating a torque command value of said first rotating electric machine such that the electric power discharged from said power storage device does not exceed an upper limit value,
when a torque restricting condition including simultaneous operation of an accelerator pedal and a brake pedal as well as a vehicle speed exceeding a threshold value is met, said control device changing said upper limit value to a further restricted value and calculating the torque command value of said first rotating electric machine,
and wherein said control device calculates the torque command value of said first rotating electric machine based on a temporarily relaxed value of said further restricted value of said upper limit value when said upper limit value is greater than a power requested by a driver in a normal operation, and calculates the torque command value of said first rotating electric machine based on said upper limit value, prohibiting usage of a temporarily relaxed value of said upper limit value, when the power requested by the driver is greater than said upper limit value in a case where said torque restricting condition is met.

3. The hybrid vehicle according to claim 1, further comprising a second rotating electric machine having a rotational shaft rotating in cooperation with said drive shaft.

4. A control method for controlling a hybrid vehicle, said hybrid vehicle including
an internal combustion engine,
a first rotating electric machine,
a power storage device supplying electric power to said first rotating electric machine,
a drive shaft rotating in cooperation with a wheel, and
a power split mechanism splitting power mechanically between a rotational shaft of said internal combustion engine, a rotational shaft of said first rotating electric machine, and said drive shaft,
said control method comprising the steps of:
determining, by a control device, whether a torque restricting condition is met or not,
when said torque restricting condition is not met, setting, by the control device, an upper limit value of electric power discharged from a power storage device supplying electric power to said first rotating electric machine as a parameter for calculating a torque command value of said first rotating electric machine,
when said torque restricting condition is met, setting, by the control device, a further restricted value of said upper limit value as said parameter, and
calculating, by the control device, a torque command value of said first rotating electric machine based on said parameter,
said torque restricting condition including simultaneous operation of an accelerator pedal and a brake pedal as well as a vehicle speed exceeding a threshold value, and
wherein said control device calculates the torque command value of said first rotating electric machine based on a temporarily relaxed value of said further restricted value of said upper limit value when said internal combustion engine is to be started using said first rotating electric machine in a normal operation, and calculates the torque command value of said first rotating electric machine based on said upper limit value, prohibiting usage of a temporarily relaxed value of said upper limit value, when said internal combustion engine is to be started using said first rotating electric machine in a case where said torque restricting condition is met.

5. The hybrid vehicle according to claim 2, further comprising a second rotating electric machine having a rotational shaft rotating in cooperation with said drive shaft.

6. A control method for controlling a hybrid vehicle, said hybrid vehicle including
an internal combustion engine,
a first rotating electric machine,
a power storage device supplying electric power to said first rotating electric machine,
a drive shaft rotating in cooperation with a wheel, and
a power split mechanism splitting power mechanically between a rotational shaft of said internal combustion engine, a rotational shaft of said first rotating electric machine, and said drive shaft,
said control method comprising the steps of:
determining, by a control device, whether a torque restricting condition is met or not,
when said torque restricting condition is not met, setting, by the control device, an upper limit value of electric power discharged from a power storage device supplying electric power to said first rotating electric machine as a parameter for calculating a torque command value of said first rotating electric machine,
when said torque restricting condition is met, setting, by the control device, a further restricted value of said upper limit value as said parameter, and
calculating, by the control device, a torque command value of said first rotating electric machine based on said parameter,
said torque restricting condition including simultaneous operation of an accelerator pedal and a brake pedal as well as a vehicle speed exceeding a threshold value, and
wherein said control device calculates the torque command value of said first rotating electric machine based on a temporarily relaxed value of said further restricted value of said upper limit value when said upper limit value is greater than a power requested by a driver in a normal operation, and calculates the torque command value of said first rotating electric machine based on said upper limit value, prohibiting usage of a temporarily relaxed value of said upper limit value, when the power requested by the driver is greater than said upper limit value in a case where said torque restricting condition is met.

* * * * *